United States Patent [19]

Bolger et al.

[11] Patent Number: 4,800,328

[45] Date of Patent: Jan. 24, 1989

[54] INDUCTIVE POWER COUPLING WITH CONSTANT VOLTAGE OUTPUT

[75] Inventors: John G. Bolger, Orinda; Lung S. B. Ng, Berkeley, both of Calif.

[73] Assignee: Inductran Inc., Berkeley, Calif.

[21] Appl. No.: 166,733

[22] Filed: Mar. 2, 1988

Related U.S. Application Data

[63] Continuation of Ser. No. 887,242, Jul. 18, 1986, abandoned.

[51] Int. Cl.[4] .............................................. H02J 7/00
[52] U.S. Cl. ......................................... 320/2; 336/83; 320/39; 191/4; 191/10
[58] Field of Search ............... 320/2.39; 323/222, 328, 323/329, 307, 308, 261; 336/DIG. 2, 83; 191/4.10

[56] References Cited

U.S. PATENT DOCUMENTS

| 3,521,147 | 7/1970 | Ostreicher | 320/39 X |
| 3,840,795 | 10/1974 | Roszyk et al. | 320/2 |
| 3,914,562 | 10/1975 | Bolger | 191/4 X |
| 3,938,018 | 2/1976 | Dahl | 320/2 |
| 3,939,391 | 2/1976 | Winnacker | 320/2 |
| 4,587,486 | 5/1986 | Soyck | 336/83 |

FOREIGN PATENT DOCUMENTS

7903237  10/1979  Netherlands ............. 191/10

Primary Examiner—Patrick R. Salce
Assistant Examiner—Anita M. Ault
Attorney, Agent, or Firm—Owen, Wickersham, and Erickson

[57] ABSTRACT

A constant voltage inductive power coupling for magnetically transferring electrical power from a power source through an air gap to a load comprising a first electromagnetic inductor connected to a power source to generate a shaped alternating magnetic field, a said inductor with a saturable core separated by an air gap from the first inductor and magnetically coupled thereto to receive the shaped magnetic field, the core being responsive to the field to enter a state of magnetic saturation. A coil is electromagnetically coupled to the saturable core and has output leads connected to the load. A capacitor is in electrical communication with the coil to form a tuned circuit that is below resonance at the coupling operating frequency. The magnetic field induced by the first inductor to the second inductor causes voltage in the coil, whose magnitude is determined by the amount of magnetic flux in the core. The saturable core is responsive to any change in input voltage to magnetically counteract such change so as to maintain the core in its state of saturation thereby tending to keep the output voltage constant. Also any increase in load current is associated with a closer approach of the tuned circuit to a resonant condition tending to maintain the output voltage at a constant level. The invention is particularly useful in battery charging circuits or for other applications where the voltage required must be kept at a constant level.

20 Claims, 4 Drawing Sheets

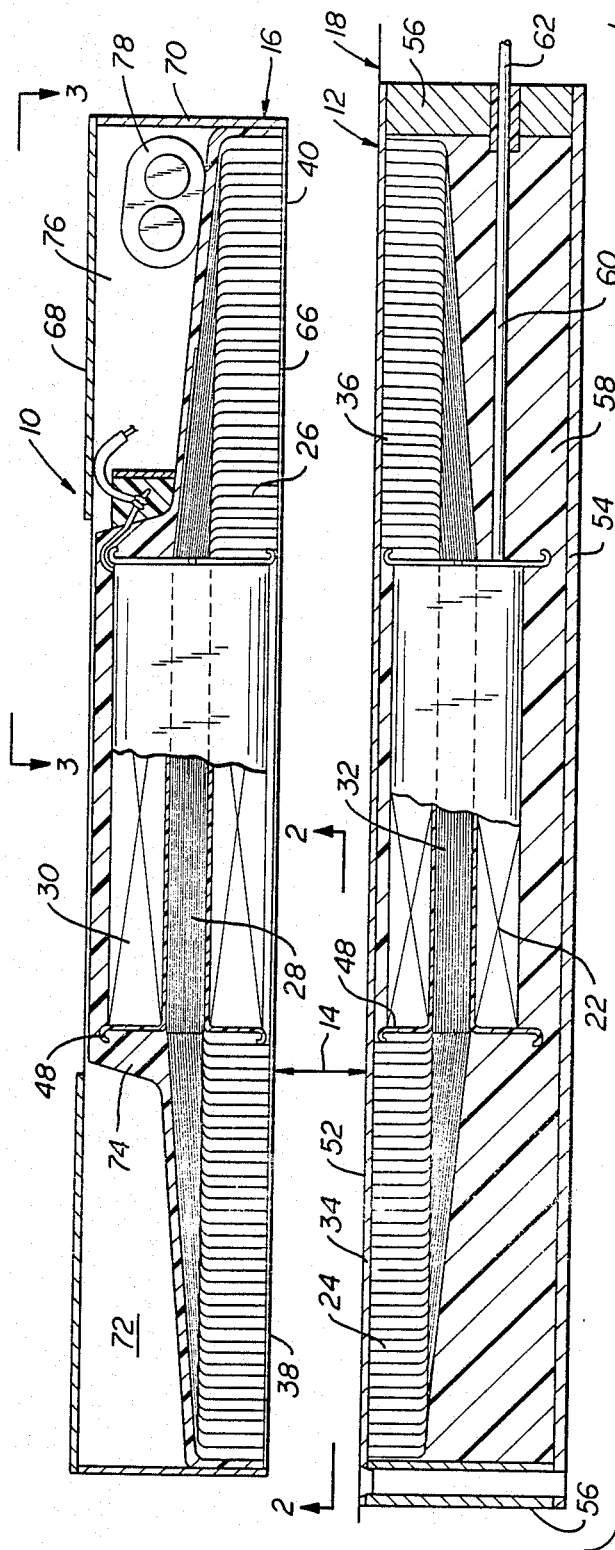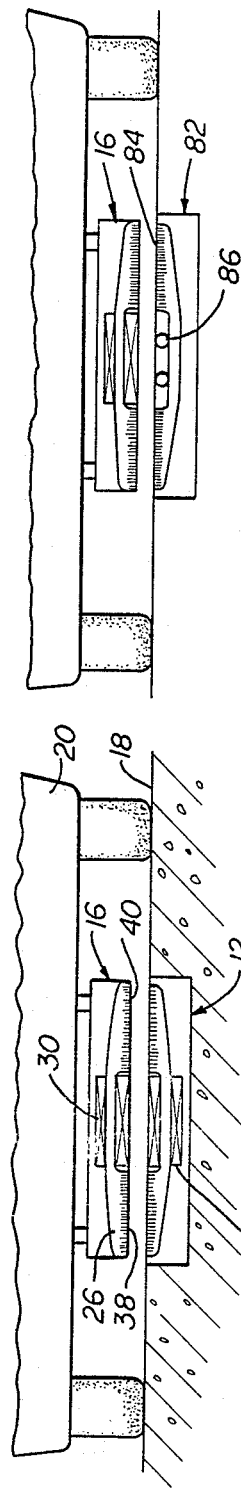

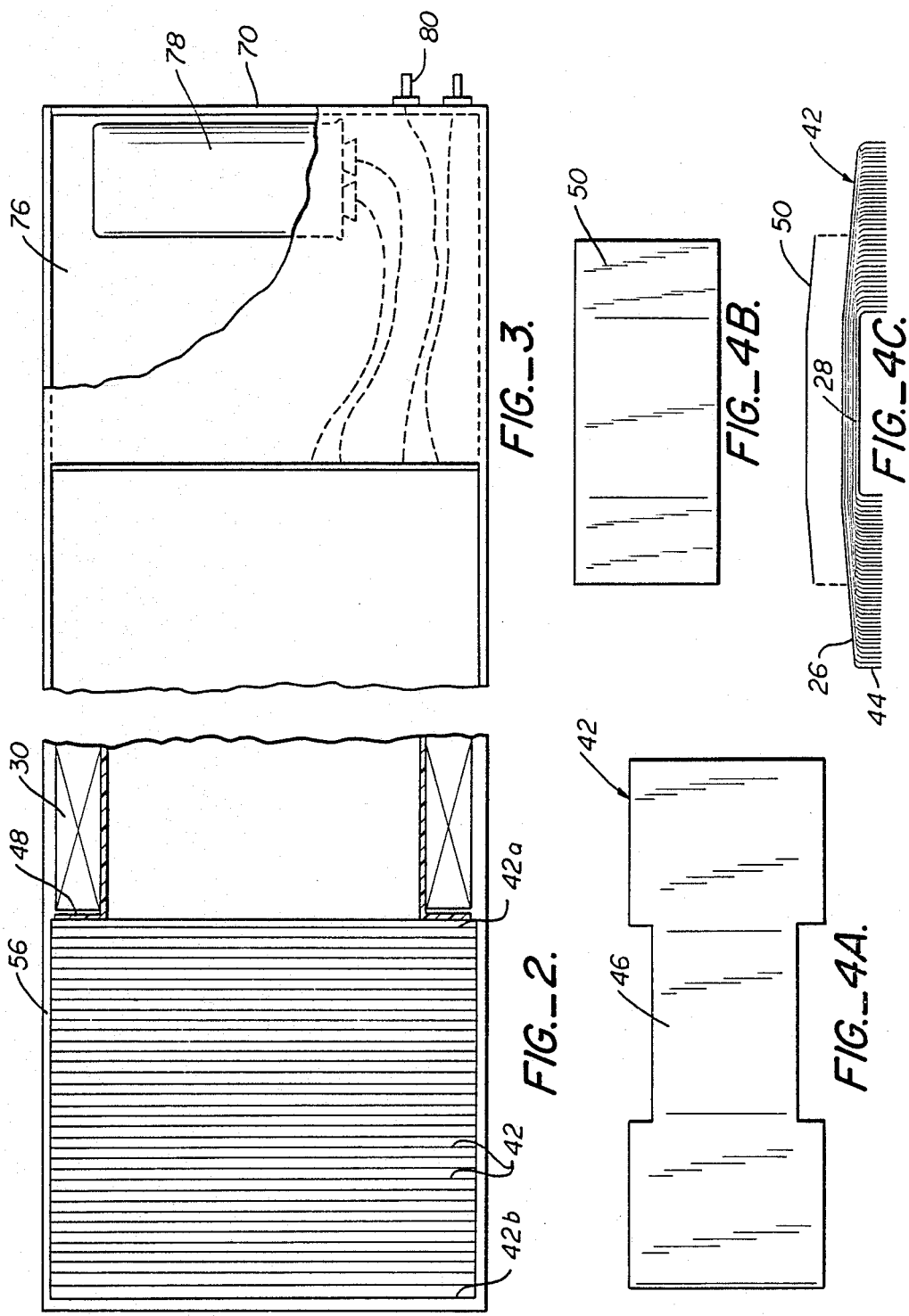

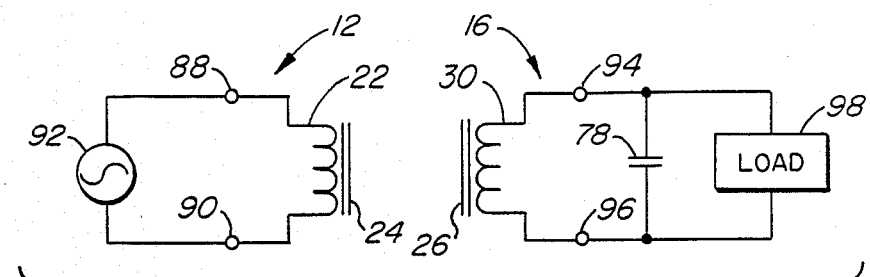
FIG._5.
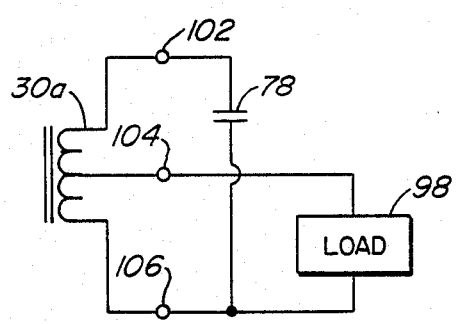
FIG._6.
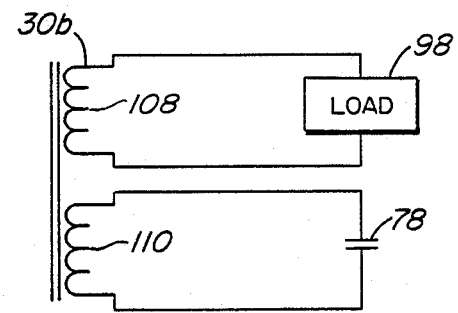
FIG._7.
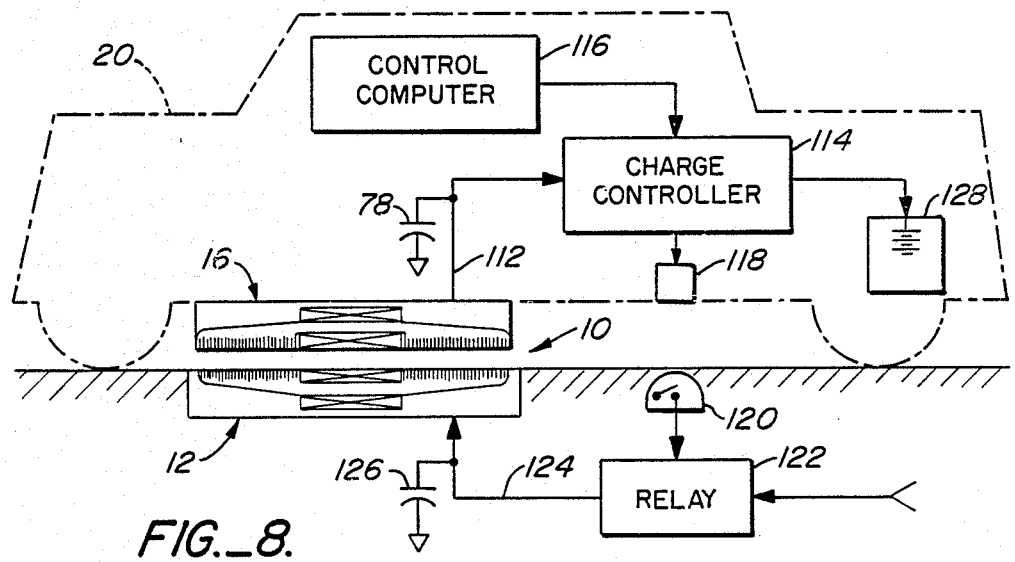
FIG._8.

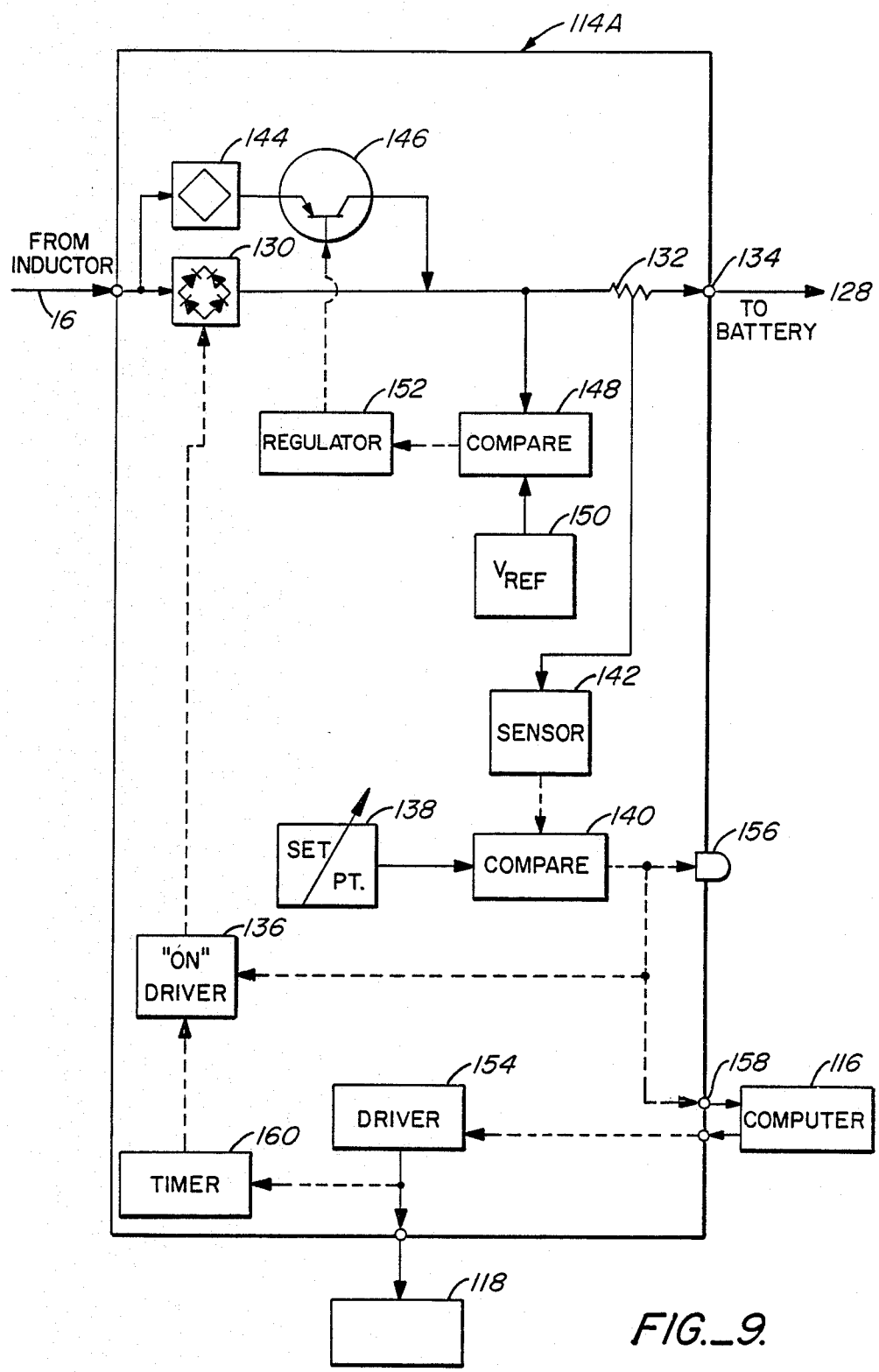
FIG._9.

INDUCTIVE POWER COUPLING WITH CONSTANT VOLTAGE OUTPUT

This application is a continuation of Ser. No. 887,242 filed July 18, 1986 now abandoned.

The present invention relates generally to apparatus for distributing electrical power, and more particularly to an inductive coupling for transferring power through an air gap.

BACKGROUND OF THE INVENTION

Inductive power couplings are used to transfer electrical power to mobile equipment or to other devices under conditions that do not favor the use of trailing cables, sliding contacts, or the like. Since an inductive coupling transfers power by means of a magnetic field that extends through an air gap, safety, durability, and reliability are improved by the elimination of the problems associated with frayed cables and exposed contacts.

Electric power is used in mobile equipment to operate devices such as battery charges, propulsion equipment, control systems and the like. These devices typically require electrical power from a constant-voltage source. Accordingly, there arose a need for an inductive coupling capable of providing power at a constant voltage.

Constant voltage transformers, also known as ferroresonant transformers, are an effective source of constant voltage. A linear reactor is used in or with these transformers in conjunction with a capacitor and a saturable steel core in order that the effects of varying input voltage and output current are compensated for in maintaining a relatively constant output voltage. A precise air gap in a magnetic shunt between input and out windings is typically used in these transformers in order to achieve the linear reactance that is required.

An inductive power coupling consists of two inductors that are separated in operation by an imprecise and relatively large air gap. This construction precludes the use of a precisely controlled shunt reactance between the input and output windings in the manner of a ferro-resonant transformer. Accordingly, some other means of voltage regulation must be provided.

It has been proposed to regulate the voltage provided by an inductive coupling by means of switchable taps on the output winding of the coupling, but such an expedient provides only coarse regulation in a series of discrete steps. It has also been proposed to use solid-state switching regulators, but such regulators are costly and electronically complex.

In U.S. Pat. No. 3,914,562 (Bolger), means are proposed for regulating the output voltage from an inductive coupling by varying the air gap between the input and output inductors. In U.S. Pat. No. 4,331,225, also issued to Bolger, means are proposed for regulating the output voltage by switching various ones of a plurality of capacitors across the output winding. However, both of these devices require active controls that suffer from complexity and high cost, and hence, prior to the present invention, the need remained for an uncomplicated and economical means to regulate the output voltage from an inductive coupling.

It is, therefore, a general object of the present invention to provide an improved inductive power coupling for coupling power through an air gap that produces a constant voltage output despite fluctuations in the input power supply and the output load.

Another object of the invention is to provide an inductive power coupling that produces a constant voltage output and is constructed economically with a minimum of components.

Another object of the invention is to provide an inductive power coupling that is constructed so that the core of the pickup or output inductor will operate at its saturation level and, despite variations in supply power to the input inductor and the output load, mutual flux between the two inductors will remain essentially constant, thereby providing a constant output voltage from the pickup inductor.

Still another object of the invention is to provide an improved inductive power coupling that is particularly useful in combination with a battery charging circuit for an electrically powered vehicle.

Yet another object of the invention is to provide an inductive power coupling in combination with a battery charging circuit which automatically operates in a trickle charge mode at certain predetermined levels of battery condition.

SUMMARY OF THE INVENTION

In accordance with the present invention, an economical constant voltage inductive power coupling is provided that produces continuous rather than discrete voltage regulation with a minimum number of components, In general, the coupling comprises a first inductor, which may be designated a source or input inductor that is normally embedded in the ground or floor of a coupling installation and a second inductor which produces a constant output voltage. The first inductor is comprised of a steel core that may or may not be saturable in operation, with a coil wound around the core connected to an alternating current power source. The second or pickup inductor for the coupling is normally mounted on a vehicle which when positioned above the first inductor is separated from it by an air gap. This second inductor is comprised of a saturable steel core around which a coil is wound and having output leads connected to a relatively large capacitor in the output circuit. The alternating current output from the second inductor may be furnished through a direct current rectifier to a battery charging circuit or directly to drive motors for the vehicle.

The first and second inductors are coupled by mutual magnetic flux through the steel cores and across the air gap between them, inducing voltage in each turn of the output coil, which is proportional to the amount of magnetic flux. In accordance with the invention, the coupling is constructed to operate with a portion of the core of the second or output inductor in saturation. When increased magnetomotive force, i.e., ampere turns, is applied to the first or input inductor, it will cause only a small increase in mutual flux in the coupled cores, even though it causes a proportionally much larger increase in leakage flux, which does not affect the output voltage.

Thus, in accordance with the invention, an increase in input voltage will cause an increase in input current, but the increase will have little effect on output voltage of the second inductor because the increase in mutual flux is very small due to the saturated condition of this core. An increase in output current will cause a proportional increase in leakage flux and in the associated inductive component of output current. When combined with the effect of the current in the large capacitor in the output circuit, the current through which is not affected by the increase in output current, the output current more closely approaches a condition of resonance, i.e., unity power factor, and the output voltage will tend to be limited and maintained at a level determined by the amount of flux in the saturated core.

It will be appreciated from the foregoing that the present invention represents a significant advance in the field of inductive power coupling in that smoothly regulated, nearly constant voltage is provided from couplings that are constructed economically with a minimum of components.

Other objects, features and advantages of the present invention will become apparent from the following more detailed description thereof taken in conjunction with the accompanying drawing.

BRIEF DESCRIPTION OF THE DRAWING

FIG. 1 is a view in elevation and in section of input and output inductors for a constant voltage inductive power coupling according to the present invention.

FIG. 1A is a view in elevation and in section showing a typical installation of the inductive power coupling of FIG. 1.

FIG. 1B is a view in elevation and in section showing the constant voltage output inductor according to the present invention in combination with a dynamic input inductor.

FIG. 2 is a fragmentary bottom plan view of the output inductor for the coupling of FIG. 1 and taken along line 2—2 thereof.

FIG. 3 is a fragmentary top plan view of the output inductor for the coupling of FIG. 1, taken along line 3—3 thereof.

FIG. 4A is a plan view of one core lamination for the output power inductor showing a top lamination.

FIG. 4B is a view in elevation of an output inductor core according to the invention, with a top trimming lamination separated therefrom.

FIG. 4C is a plan view of the trimming lamination shown in FIG. 4B.

FIG. 5 is a schematic diagram of a coupling according to the present invention.

FIG. 6 is a schematic diagram of an alternate embodiment of the saturable core and output inductor portion for the coupling of FIG. 5, showing an inductor having a plurality of taps.

FIG. 7 is a schematic diagram of another alternate embodiment of the saturable core and inductor portion of FIG. 5, showing an inductor having a plurality of windings.

FIG. 8 is a schematic block diagram of a coupling for a vehicle having a battery and a charge controller according to the invention.

FIG. 9 is a schematic block diagram of a charge controller for use with the battery charger shown in FIG. 8.

DESCRIPTION OF THE PREFERRED EMBODIMENT

With reference to the drawing, FIG. 1 shows a constant voltage inductive power coupling 10 according to the present invention for magnetically transferring electrical power from a first inductor 12 connected to a power source through a gap 14 to a second inductor 16 connected to a load.

In a typical application of the coupling 10, as shown in FIG. 1A, the first inductor 12 may be installed at a fixed location within the ground 18 or a support structure flush with the ground, and the second inductor 16 may be installed in a vehicle 20 for the purpose of either charging a series of batteries or for directly energizing electrical drive motors or the like.

Together the first and second inductors comprise electromagnetic means for generating a shaped alternating magnetic field, each having a core to receive the field, and a coil electromagnetically coupled to the core.

Thus, the electromagnetic inductor 12 includes an input coil 22 to generate the field and an input core 24 to shape the field. The second inductor 16, located in a spaced-apart relationship to the first inductor to define the gap 14 therebetween, has a saturable core 26 that is magnetically coupled to the input core 24 to receive the shaped magnetic field, the core 26 being responsive to the field to enter a state of magnetic saturation. In an embodiment shown, the core 26 of the output inductor 16 has a saturable constricted portion 28 that is responsive to the field to enter a state of magnetic saturation with a lesser total magnetic flux than would be required to saturate the remaining portions of the core 26.

A coil 30 is electromagnetically coupled to the core 26 of the second inductor whereby the alternating magnetic field induces voltage in the coil 30 at an output voltage determined by the total magnetic flux in the core 26. The input inductor 12 is responsive to any change in input voltage to electromagnetically counteract an associated change in the magnetic flux in the opposing cores 24 and 26 so as to maintain the core 26 in a state of saturation, thereby tending to keep the output voltage constant.

The input core 24, which is usually embedded in the ground, as shown in FIG. 1, is generally U-shaped in cross section, with a center section 32 having first and second extremities 34 and 36 at opposite ends that serve as poles in the magnetic circuit. These poles extend upward to the surface plane of the ground 18. The input coil 22 is wound around the center portion 32 of the core 22, which is constricted in width to accommodate the input coil and to provide a saturable portion of the input core 24, when desired.

The output core 26 is also generally U-shaped and has first and second pole extremities 38 and 40 corresponding with the pole extremities 34 and 36, respectively, of the input core 24. In a typical installation, (as shown in FIG. 1A), the core 26 is mounted on the underside of a vehicle 20 with its pole extremities 38 and 40 extending downward towards the ground. The core 26 is spaced far enough above the ground to provide adequate obstacle clearance as the vehicle means about but with its poles close enough to receive the magnetic field from the input core 24 when the vehicle is maneuvered into a position above it.

The coil 30 is preferably wound around the constricted center section 28 of the core 26, although it could be wound around another portion of the core 26, if desired. The construction of the core is advantageous in that the inductor may be enclosed in a simple rectangular package of minimum size. It is also advantageous in reducing the dimensions of the coil 30, thereby saving weight and resistance in the coil.

In the embodiment shown, both cores 24 and 26 comprise a plurality of magnetically permeable sheets or laminations 42 which are held closely together in such a manner to form an electromagnetic flux path. These sheets are generally rectangular in plan-form, and they vary in length from an inner sheet 42a to an outer sheet 42b, as shown in FIG. 2. Each sheet is U-shaped in cross section with outer, spaced-apart and parallel flange portions 44 connected by a central web portion 46. Also, each sheet 42 is preferably coated with a thin insulating layer of insulating material, such as magnesium oxide, having a thickness of around 0.001 inch. For each core, the web portions of the U-shaped sheets are held together to form a constricted center section, and progressively larger sheets are stacked so that the webs 46 are parallel to each other, the opposite flange portions 44 of the sheets at their ends thus being progressively spaced apart to form the poles of the core. In plan form, as shown in FIG. 4A, each core sheet 42 is cut to a narrower width to form the constricted center section 28 of the core where the web portions of the sheets are close together (FIG. 4C). As shown in FIG. 1, a plastic coil form 48 is provided at opposite ends of the narrowed center section to support the coil 22 or 30 which is wound around the laminated sheets 42.

The thickness of the permeable sheets 42 and the number of sheets in each inductor determine the amount of mutual flux that the inductor core can utilize when it is in saturation and, thus, its output voltage limit. For example, assume that a constant output voltage of one volt per coil turn is desired for a certain pickup or output inductor, and the input inductor is supplied with power of at least one volt per turn of the input coil. In order for the constricted center portion 28 of the output core 26 to enter a state of saturation, it has been found that the cross-sectional area of the constricted center portion 28 should be approximately 3.2 square inches of sheet material, such as silicon steel sheet. Thus, for a typical core construction for an output inductor, 40 sheets or laminations 42 having a thickness of 0.014 inches may be used to provide a magnetic coupling according to the present invention.

When necessary to provide an output inductor of more precise voltage output characteristics, a trimming sheet 50 may be attached to the top surface of the core 26, as shown in FIG. 4C. This sheet may be cut to the same width as the web portion 46 of a sheet 42 and to a desired length. It can then be bonded to the upper surface of the core by a suitable adhesive material before the coil form 48 and coil 30 are attached to the inductor 16.

In the embodiment shown in FIG. 1, both of the inductors 12 and 16 are enclosed in a suitable housing to facilitate their installation in either the ground or on a vehicle 20.

The inductor 12 is provided with a housing comprised of a top member 52 that covers the edges of the core sheets and is adapted to be flush with the floor or ground surface 18. A bottom member 54 is spaced from the plastic coil form 48 on the opposite side of the inductor. These members are connected to a pair of side members and to transverse end members 56 which bear against the opposite end flanges of the outermost core sheet to form an enclosure around the inductor core. Space within the enclosure is filled with a suitable insulating or potting material 58 such as a mixture of sand and resin to hold the inductor firmly in place and insulate it. Leads 60 to the coil for the inductor are connected through suitable connections 62 in one end wall.

The output inductor 16 is provided with a housing constructed of the same materials and in a similar manner as the input inductor housing. This housing, installed on the vehicle 20, includes a relatively thin bottom member 66 which is flush with the lower edges of the sheets and is parallel with a top member 68 on the opposite side of the inductor. These members are connected with end members 70 and side members 72 to form the housing surrounding the inductor 16 as a relatively compact package. Within the enclosure, the inductor is preferably surrounded by a layer of non-conductive, insulating plastic or potting compound 74. In a cavity 76 to one side of the central coil 30 within the housing are mounted components forming a capacitor 78. Leads to the coil and the capacitor are furnished through connections 80 in one end wall, as with the inductor 12 (FIG. 3).

The first electromagnetic inductor 12 has been shown embedded in the ground, but it will be apparent that it could be affixed to a post, embedded in a wall, suspended overhead, or located in some other place accessible to the vehicle. The core 26 for the pickup inductor 16 would then be mounted in front of or behind the vehicle, on a side thereof, or on top as necessary to permit maneuvering the vehicle so as to locate the core 26 near the electromagnetic inductor 12 when necessary to couple electric power to the vehicle.

In the embodiment described above, the vehicle must remain in a fixed position while it receives electrical power through the inductive coupling, for example, for charging a battery, and this embodiment is accordingly referred to as "static". In an alternate "dynamic" embodiment, the vehicle could also receive electric power through inductive coupling as it travels along the ground. This dynamic embodiment is similar to the static embodiment except that an inductor providing a continuous magnetic field must be installed along the vehicle's route of travel rather than only at one place as in the static embodiment.

One form of such a dynamic magnetic power inductor, as shown schematically in FIG. 1B, comprises an elongated electromagnetic field means, or core 84, having at least one continuous conductor 86 extending lengthwise between the poles of the elongated input core. An alternating current flows through the conductor 86 to generate a magnetic field that is shaped by the input core 84. Here, the pickup or output core 26, installed in a vehicle that is movable along the elongated input core 84, is magnetically coupled therewith to receive the shaped magnetic field. As the vehicle moves along a route defined by the elongated input core, the core 26 continues to remain in magnetically coupled relationship with the input core and will receive power therefrom to drive the vehicle. A more detailed description of a dynamic magnetic power input inductor is described in U.S. Pat. No. 4,007,817 (Bolger).

As shown schematically in FIG. 5, the input coil 22 has terminals 88 and 90 to receive electric power from a power source shown symbolically as an alternating current voltage source 92 connected to the terminals 88 and 90. The output coil 30 has terminals 94 and 96 connected to a load 98. When the inductive coupling is operating, the output core 26 is driven into saturation by the magnetic field received from the input core 24, or, if the core 26 has the constricted portion 28, then only the constricted portion 28 is driven into saturation.

The input voltage is opposed by an induced electromagnetic force in the coil 22 that is the vector sum of forces resulting from mutual and leakage flux. Since the amount of mutual flux is limited by the saturated steel in the output core 26, changes in input voltage will cause changes predominantly in the relatively large amount of leakage flux in the input inductor rather than in the amount of mutual flux. Conversely, a decrease in input voltage will cause a larger effect on leakage flux than on mutual flux. Thus, changes in input voltage will have only a small effect on mutual flux and thus on output voltage.

As shown in FIG. 5, the capacitor 78 is placed in electrical communication with the coil 30, for example, by connecting the capacitor in parallel with the inductance of the coil 30 to form a tuned circuit that is near resonance at the operating frequency. The capacitor 78 will conduct an amount of current that is relatively constant, since the voltage imposed on its does not vary widely. When current is supplied by coil 30 to the load 98, the current will have an inductive component because of the leakage reactance of the coil. This inductive component will increase with load current, and when combined with the capacitive current in the coil, the total current in the coil will more closely approach a condition of unity power factor, i.e., resonance. Thus, the voltage from the coil will tend to be maintained at a level limited by the saturation of the core steel. Were it not for the presence of the capacitor 78, a significant decrease in voltage due to inductive leakage reactance would occur with increases in load current. The relatively large leakage reactance that is characteristic of inductive power couplings is thus used to advantage in achieving a constant voltage characteristic relative to both changes in input voltage and in output current.

In an alternate embodiment, the capacitor 78 can be operated at a different voltage than the load 98 by means of a coil 30a having a plurality of taps 100, 102, and 104, as shown in FIG. 6. Here, the capacitor 78 is connected between taps 102 and 106 for operation at a higher voltage than the load voltage in order to use a capacitor that is smaller and less costly than otherwise would be the case. Another embodiment that accomplishes a similar result uses a coil 30b that comprises a plurality of windings 108 and 110 as shown in FIG. 7. Here, the load 98 is connected to the winding 108 and the capacitor 78 is connected to the winding 110. In this embodiment, the capacitor circuit and the load circuit are electrically insulated in situations where such an arrangement is advantageous.

In operation, the constant voltage inductive coupling 10 according to the present invention can be particularly useful as a power source for a battery charger for electric vehicles, as shown in FIG. 8. As shown, the inductor 16 has an A.C. output which is connected in parallel with the capacitor 78 and through a lead 112 to a charge controller 114. This controller is connected to a vehicle computer 116 which provides on/off input signals that control activations of the charging circuit. The controller also functions to control power supplied via output signals to a magnetic switch control 118. The magnetic switch control 118 is associated with a magnetic reed switch 120 that controls a relay 122 in a line 124 from a power source to the inductor 12. A capacitor 126 in the power line 124 is connected thereto to provide a power factor correction to input power. The controller also produces a constant D.C. output to a battery 128 for the vehicle. A more detailed description of the controller is provided below in conjunction with FIG. 9.

The most common battery used in vehicles is the lead acid battery. Such batteries can be charged in the shortest time without damage or overheating when the charging voltage is maintained just below that which will cause the electrolyte to break down and evolve hydrogen and oxygen, i.e. to "gas." In the case of conventional lead acid batteries this voltage is about 2.37 volts per cell; in the case of "maintenance free" batteries with lead-calcium alloy plates, the voltage is slightly higher. The current that a particular battery will accept at optimum charging voltage depends on its state of charge, its temperature, and the condition of its plates.

Thus for electric vehicles wherein the time available for battery charging is either limited or causes the vehicle to be unavailable for service, a constant voltage charger is advantageous in that it shortens the time that is required to recharge the battery.

The output voltage from the constant voltage coupling 10 remains relatively constant within the rated current of the coupling, with the exception of a slight rise at low current. The rated power of the coupling is typically determined by the cross section and number of turns in its coils 22 and 30 and the surface area that is available to dissipate the resistive losses in the coils. The range of current over which the voltage will be held relatively constant depends on the voltage drop through the resistance of the output coil and the amount of capacitive current that is available to offset the effects of leakage reactance.

When used as a source of power for battery charging, a full wave rectifier is used to convert the coupled AC voltage to DC. It has been found that at low output current the waveform of the rectified voltage changes in such a way that the time averaged value of the voltage increases. It is desirable in the operating cycles of some electric vehicles to lower the charging voltage when the battery nears a state of full charge so that the vehicle can continue to be charged over a long period of time at low rate without damage. This can be accomplished by interposing a regulating transistor between the charger's normal output terminal and the battery to decrease the charging voltage to a "trickle" charge level. The power dissipated in the transistor is low because the current is low.

FIG. 9 shows a block diagram of a charge controller 114a that provides for trickle charging a battery 128. The constant voltage coupling 10 provides input power to the charge controller, in which a full wave rectifier 130 rectifies the AC input from coupling 10. The DC output from rectifier 130 passes through a shunt resistor 132 to an output terminal 134. The rectifier 130 is comprised of two diodes and two silicon controlled rectifiers so that the current through the rectifier may be turned on and off as desired by signals from a driver 136.

The output of the controller 114a is connected to the battery 128. When the current from the charger has caused the battery to become nearly fully charged, its voltage will tend to rise accordingly, and current from the charger will be reduced in accordance with the characteristic curve of the inductive coupling 10. When the current has dropped to a desired level as determined by a setting using a trim-potentiometer 138 connected to a current comparator 140, the latter receives an input from a current sensor 142 connected to the shunt resistor 132. The signal generated by the current comparator 140 causes the rectifier driver 136 to turn off the rectifier 130 when the output current has dropped to the level set by the trim-potentiometer 138.

When the rectifier 130 is turned off, its input voltage will be higher than its output voltage which is also battery voltage. This voltage drop wil thus appear across a low current rectifier 144 and a pass transistor 146, which are in parallel with the rectifier 130. A voltage comparator 148 connected to the output of the pass transistor, senses the difference between the battery voltage and a reference voltage from a pre-set reference means 150, such as a zener diode. This difference is representative of a desired current for trickle charging. The error signal from the comparator 148 is provided to a regulator 152 that transforms that signal to a current output which is connected to drive the base of the pass transistor 146. The drive current is sufficient to cause the transistor 146 to pass enough charging current to the battery to cause its voltage to rise to the desired trickle voltage.

Auxiliary functions of the controller include the capability of responding to a command from a vehicle's control electronics to turn the charger on or off. This is accomplished by using an electromagnet drive transistor 154 to turn on an electromagnet switch control 118, also shown in FIG. 8, which in turn activates a magnetic switch 120 to turn on the input inductor 12. An indicator 156 is activated by the signal from the current comparator 140 whenever the charging current is above a particular level, and an electronic signal is also provided from a terminal 158 to the vehicle computer under this condition.

A timer 160 is provided in the control 114*a* that ensures that rectifier 130 will stay on for a selected minimum time after the charger is turned on in order to ensure that even a battery at a high state of charge will receive a short period of charging at other than a trickle rate.

Alternatively the rise in voltage at low current can be used to advantage when the charging cycle is to be terminated when the battery is fully charged. The rise in voltage above the gassing limit will cause the battery to gas for a short time until the battery is fully charged. This process tends to stir the electrolyte in the cells of the battery, reducing the stratification that results from variation in the acid concentration in the electrolyte. The process has been found to be desirable with respect to battery performance and life when it is not excessively used, and tends to even or equalize the state of charge among the cells of the battery.

As set forth above, it is seen that the constant voltage inductive power coupling 10 according to the present invention provides a continuously regulated output voltage with a minimum number of components, thereby providing a significant advance over prior power couplings that regulate the output voltage in discrete steps, or that require active mechanisms or electronic circuits to achieve similar results.

Various modifications and changes may be made with regard to the foregoing detailed description without departing from the spirit of the invention. It is therefore to be understood that, within the scope of the appended claims, the invention may be practiced otherwise than as specifically described.

What is claimed is:

1. A constant voltage inductive power coupling for magnetically transferring electrical power from a power source through an air gap to a load, the coupling comprising:

electromagnetic means with substantial leakage reactance, responsive to the power source to generate a shaped alternating magnetic field;

a saturable core in spaced-apart relationship to the electromagnetic means to define an air gap there between and magnetically coupled thereto to receive mutual flux of the shaped magnetic field, the core having enlarged poles and a region of reduced cross sectional area such that the region is in a state of magnetic saturation when the amount of magnetic flux that is required to induce the desired constant output voltage is present in the core, thereby tending to limit the output voltage to the desired constant voltage and counteracting any excess electromagnetic force in the electromagnetic means by causing leakage flux from the electromagnetic means;

a coil, electromagnetically coupled to the core whereby the magnetic field induces voltage in the coil, the voltage determined by the amount of magnetic mutal flux in the core, said saturable core also providing an inductive component of leakage flux which varies in response to any change in input voltage to said electromagnetic means to magnetically counteract an associated change in said field so as to maintain the core in its state of saturation thereby tending to keep the output voltage from said coil constant; and a capacitor in electrical communication with said coil to form therewith a tuned circuit that is below resonance at operating frequency when said core is in its saturated state, any increase in output current being associated with a closer approach of the circuit to a resonant condition and thereby tending to maintain the output voltage at a constant level.

2. A power coupling according to claim 1 wherein the capacitor is connected in parallel with said coil.

3. A power coupling according to claim 1 wherein said coil has a plurality of taps and further comprising a capacitor connected between two of the taps.

4. A power coupling according to claim 1 wherein said coil comprises a plurality of windings and further comprising a capacitor connected across one of the windings.

5. A coupling according to claim 1 wherein the electromagnetic field means comprises an input coil to generate the field and an input core to shape the field.

6. A constant voltage inductive power coupling for magnetically transferring electrical power from a power source through an air gap to a load, the coupling comprising:

a first electromagnetic inductor means with substantial leakage reactance, responsive to the power source to generate a shaped magnetic field;

a second inductor means with a core having a relatively dense constricted portion of magnetically permeable material, the core being in a spaced-apart relationship to said first electromagnetic inductor means to define an air gap there between and magnetically coupled thereto to receive the shaped magnetic field, said constricted portion having reduced cross sectional area such that the region is in a state of magnetic saturation when the amount of magnetic flux that is required to induce the desired constant output voltage is present in the core, thereby tending to limit the output voltage to the desired constant voltage and counteracting any excess electromagnetic force in the electromagnetic means by causing leakage flux from the electromagnetic means;

a coil, electromagnetically coupled to said core of said second inductor means whereby the magnetic flux in the core induced voltage in the coil at a voltage determined by the amount of flux in the core for application to the load, the core being responsive to any change in input voltage to produce an inductive component of leakage flux which magnetically counteracts an associated change in said shaped magnetic field caused by said change in input voltage so as to maintain the constricted portion of the core in its state of saturation, thereby tending to keep the output voltage from said coil constant; and a capacitor in electrical communication with said coil to form therewith a tuned circuit that is below resonance at operating frequency when said core is in its saturated state, any increase in output current being associated with a closer approach of the circuit to a resonant condition and thereby tending to maintain the output voltage at a constant level.

7. The inductive power coupling as described in claim 6 wherein said output inductor for said electromagnetic coupling comprises:

a plurality of sheets of magnetically permeable material and uniform thickness but of different lengths;

each of said sheets having a center section of uniform width and integral opposite end portions of uniform but slightly greater width, and flange members at the extreme end of each said end portion which is generally perpendicular to said center section;

said plates being arranged in a stack with their center sections aligned and contiguous to form a relatively dense, constricted portion of said core, the shortest of said plates being at the bottom of said stack with the next largest plate directly above so that the lower edges of said flange members of the plates are spaced apart outwardly in opposite directions at both ends of said inductor along a common plane to form opposite pole areas of said core; and said coil being wrapped around said constricted portion of said core.

8. The inductive power coupling as described in claim 7 including a housing for said inductor means for enclosing said core, said coil and said capacitor means; potting compound within said housing for filling voids around said inductor within said housing; and connector means attached to said housing to facilitate connection of said coil within said housing to a load.

9. A power coupling according to claim 8 wherein the capacitor is connected in parallel with the coil.

10. A power coupling according to claim 9 wherein the coil comprises a plurality of windings and further comprising a capacitor connected across one of the windings.

11. A power coupling according to claim 8 wherein the coil has a plurality of taps and further comprising a capacitor connected between two of the taps.

12. A constant-voltage inductive power coupling for magnetically transferring electric power from a power source through an air gap to a load, the coupling comprising:

elongated electromagnetic means with substantial leakage reactance, responsive to the power source to generate a shaped magnetic field;

a coupling inductor means having a saturable core in spaced-apart relationship to the electromagnetic means to define an air gap therebetween, said inductor means being movable along the electromagnetic means and in magnetically coupled relationship therewith to receive the shaped magnetic field, the core having enlarged poles and a region of reduced cross sectional area such that the region is in a state of magnetic saturation when the amount of magnetic flux that is required to induce the desired constant output voltage is present in the core, thereby tending to limit the output voltage to the desired constant voltage and counteracting any excess electromagnetic force in the electromagnetic means by causing leakage flux from the electromagnetic means;

a coil, electromagnetically coupled to the core whereby the magnetic field induces voltage in the coil, the voltage determined by the amount of magnetic flux in the core, the core being responsive to any change in input voltage to produce an inductive component of leakage flux which magnetically counteracts an associated change in said magnetic field caused by said change in input voltage so as to maintain the core in its state of saturation thereby tending to keep the output voltage constant; and a capacitor in electrical communication with said coil to form therewith a tuned circuit that is below resonance at operating frequency when said core is in its saturated state, any increase in output current being associated with a closer approach of the circuit to a resonant condition and thereby tending to maintain the output voltage at a constant level.

13. A power coupling according to claim 12 wherein the capacitor is connected in parallel with the coil.

14. A power coupling according to claim 12 wherein the coil comprises a plurality of taps and further comprising a capacitor connected between two of the taps.

15. A power coupling according to claim 12 wherein the coil comprises a plurality of windings and further comprising a capacitor connected between one of the windings.

16. A constant voltage inductive power coupling for magnetically transferring electrical power from a power source through an air gap to a load, the coupling comprising:

elongated electromagnetic field means having substantial leakage reactance, responsive to the power source to generate a shaped magnetic field;

a core having a constricted portion, the core being in a spaced-apart relationship to the electromagnetic field means to define an air gap there between, the core being movable along the electromagnetic field means and in magnetically coupled relationship therewith to receive the shaped magnetic field, the constricted portion having reduced cross sectional area such that the region is in a state of magnetic saturation when the amount of magnetic flux that is required to induce the desired constant output voltage is present in the core, thereby tending to limit the output voltage to the desired constant voltage and counteracting any excess electromagnetic force in the electromagnetic means by causing leakage flux from the electromagnetic means;

a coil, electromagnetically coupled to the core whereby the magnetic field induces voltage in the coil at a voltage determined by the amount of magnetic flux in the core for application to the load, the core being responsive to any change in input voltage to produce a leakage flux that magnetically counteracts an associated change in the voltage so as to maintain the constricted portion of the core in its state of saturation, thereby tending to keep the output voltage constant; and a capacitor in electrical communication with said coil to form therewith a tuned circuit that is below resonance at operating frequency when said core is in its saturated state, any increase in output current being associated with a closer approach of the circuit to a resonant condition and thereby tending to maintain the output voltage at a constant level.

17. A constant voltage inductive power coupling for magnetically transferring electrical power from a power source through an air gap to a battery in a vehicle, the coupling comprising:
 a first electromagnetic inductor means with substantial leakage reactance, installed in the ground and responsive to the power source to generate a shaped magnetic field;
 a second inductor means on said vehicle with a core having a saturated constricted portion, said vehicle being movable so that said core is in a spaced-apart relationship to said first electromagnetic inductor means to define an air gap there between and magnetically coupled thereto to receive the shaped magnetic field, said constricted portion having reduced cross sectional area such that the region is in a state of magnetic saturation when the amount of magnetic flux that is required to induce the desired constant output voltage is present in the core, thereby tending to limit the output voltage to the desired constant voltage and counteracting any excess electromagnetic force in the electromagnetic means by causing leakage flux from the electromagnetic means;
 a coil, electromagnetically coupled to said core of said second inductor means whereby the magnetic flux in the core induces voltage in the coil at a voltage determined by the amount of flux in the core for application to the load, the core being responsive to any change in input voltage to produce a leakage flux that counteract the change so as to maintain the constricted portion of the core in its state of saturation, thereby tending to keep the output voltage constant;
 a capacitor in electrical communication with said coil to form therewith a tuned circuit that is below resonance at operating frequency when said core is in its saturated state, any increase in output current being associated with a closer approach of the circuit to a resonant condition and thereby tending to maintain the output voltage at a constant level; and
 a battery charge control circuit connected to said coil and to said battery including rectifier means for converting the output from said second inductor means to direct current.

18. The inductive power coupling and battery charging system as described in claim 17 wherein said charge control circuit includes a control means for automatically reducing the charging rate level to the battery when the battery nears a fully charged condition.

19. The inductive power coupling and battery charging system as described in claim 17 wherein said control means comprises comparator means for comparing the output from said rectifier means with a pre-set current value and for generating a signal for reducing the output of said rectifier means to a trickle charge level.

20. The inductive power coupling and battery charging system as described in claim 17 wherein said rectifier means includes a first high current rectifier for producing an output when said battery is not fully charged and a low current rectifier connected to a pass transistor for producing an output when said first rectifier is deactivated and only a trickle charge output is required for said battery.

* * * * *